United States Patent [19]

Iwasaki

[11] Patent Number: 5,490,056
[45] Date of Patent: Feb. 6, 1996

[54] INVERTER APPARATUS HAVING TWO CONTROL MODES AND APPARATUS USING THE SAME

[75] Inventor: Masahiko Iwasaki, Nagoya, Japan

[73] Assignee: Mitsubishi Denki Kabushiki Kaisha, Tokyo, Japan

[21] Appl. No.: 40,434

[22] Filed: Apr. 1, 1993

[30] Foreign Application Priority Data

Apr. 2, 1992 [JP] Japan ................................ 4-080797

[51] Int. Cl.⁶ .............................. H02M 7/42; H02M 7/74
[52] U.S. Cl. ............................................ 363/97; 318/801
[58] Field of Search ................................ 363/41, 97, 98, 363/131, 132, 150; 318/798–812

[56] References Cited

FOREIGN PATENT DOCUMENTS

| 4231359 | 4/1993 | Germany . |
| 62-165799 | 10/1987 | Japan . |
| 63-187591 | 12/1988 | Japan . |
| 2131396 | 5/1990 | Japan . |
| 2122434 | 1/1984 | United Kingdom . |
| 2171863 | 9/1986 | United Kingdom . |

OTHER PUBLICATIONS

Klautschek, Weberskirch, "Vektorregelung auch ohne Drehzahlistwertgeber", 1991, pp. 14, 15.
Klautschek, Speth, Simovert–P–Umrichter fur Drehstromantriebe von 30 bis 900 kw, May 1989, pp. 34–38.

*Primary Examiner*—Peter S. Wong
*Attorney, Agent, or Firm*—Sughrue, Mion, Zinn, Macpeak & Seas; Richard C. Turner

[57] ABSTRACT

An inverter apparatus and a transport system using the same comprises a pair of current detectors for detecting output currents of at least two phases of output currents of three phases, a pair of converters for converting detected currents to two axes extending perpendicularly to each other, which are rotated in synchronism with output frequency of the inverter apparatus by an orthogonal projection, a computer for adding frequency correcting set frequency with respect to output voltage and the set frequency set from the outside, in accordance with current converted to the two axes, and for deciding predetermined output voltage and output frequency by the set frequency regardless of the current, and a switch in which ON/OFF can be assigned from the outside.

3 Claims, 8 Drawing Sheets

FIG.3

| STATE OF S1 | MC1 ON | MC1 OFF | MC1 ON |
|---|---|---|---|
| STATE OF S2 | MC2 OFF | MC2 ON | MC2 OFF |
| STATE OF SL | SL ON | SL OFF | SL ON |

S: SLIP    $L_1 = l_1 + M$    $L_2 = l_2 + M$ $$\sigma' = 1 - \frac{M^2}{L_1 L_2}$$

INVERTER APPARATUS HAVING TWO CONTROL MODES AND APPARATUS USING THE SAME

FIELD OF THE INVENTION

The present invention relates to an inverter apparatus and a transport system using the same for drivingly controlling any one of a plurality of different induction motors with a single inverter and, more particularly, to an inverter apparatus for a transport system in which control modes are switched in accordance with the induction motors to execute operation or running.

BACKGROUND OF THE INVENTION

FIG. 5 of the attached drawings shows a conventional inverter apparatus. The reference numeral 1 denotes a commercial power source; 2, a power rectifier for converting the output of the commercial power source 1 to direct current; 3, a capacitor for filtering current; 4, an inverter for converting the direct current to alternating current of optional frequency and voltage; 5, a motor that is a load; 6 and 7, current detectors by which conversion is made to a voltage signal with or at a predetermined ratio in accordance with the magnitude of the output current (including positive and negative polarities); 8, a direct-current bus voltage detector in which the magnitude of direct-current bus voltage is converted to a voltage signal with a lower predetermined value; 9, a setter for setting a desired speed for the motor 5; and 10 and 11, start switches for setting a rotational direction of the motor 5, respectively.

Further, the reference numerals 13 and 14 denote pull-up resistors in which, even at the OFF position of the start switches 10 and 11, a signal to a computer 16 does not become unselective; 16, a computer (for example, a microprocessor) for synthetically discriminating or judging various signals from the setter 9, the start switches 10 and 11, the current detectors 6 and 7 and the direct-current bus voltage detector 8 to send out ON/OFF signals to switching element of the inverter 4; and 17, an amplifier circuit for electrically insulating and amplifying the ON/OFF signals outputted from the computer 16 by light and the like and, subsequently, for sending out signals to various elements of the inverter 4.

In this connection, in FIG. 5, the reference numeral 101 denotes an element which is used in the power rectifier 2, and generally is a diode; 102, an element which is used in the inverter 4, and which may be a transistor, a gate turn-off thyristor (GPO), or an insulating-gate bipolar transistor (IGBT); and 103, a diode connected to the transistor 102 in reversed polarity.

Operation will next be described. In a circuit illustrated in FIG. 5, two methods have conventionally been executed. Of the two methods, a first control system will be described with respect to a flow chart illustrated in FIG. 6, while a second control system will be described with respect to a flow chart illustrated in FIG. 7.

① First Control System

First, in FIG. 6, an analog voltage value, that is detected by the current detectors 6 and 7 in FIG. 5, is converted to a digital signal by an A/D converter which is arranged within the computer 16. The digital value is stored in a memory element within the computer 16 as value of $\hat{i}_u$ and $\hat{i}_v$ (S61).

Subsequently, conversion is made to currents $\hat{i}_d$ and $\hat{i}_q$ on a d-q axis of orthogonal or rectangular coordinates, which is rotated in synchronism with output frequency of an inverter known generally, on the basis of the value of the above-described $\hat{i}_u$ and $\hat{i}_v$. A converting equation thereof is expressed by the following equation 1 (S62):

[EQUATION 1]

$$\begin{bmatrix} \hat{i}_q \\ \hat{i}_d \end{bmatrix} = \sqrt{2} \begin{bmatrix} \sin\left(\phi + \frac{\pi}{3}\right) & \sin\phi \\ -\cos\left(\phi + \frac{\pi}{3}\right) & -\cos\phi \end{bmatrix} \begin{bmatrix} \hat{i}_u \\ \hat{i}_v \end{bmatrix} = C^T$$

where $\phi = \omega_1 t$

Subsequently, the above-described $\hat{i}_q$ and $\hat{i}_d$, and a value $R_1$ of a primary resistance and a value $R_2$ of a secondary resistance of the motor 5 in FIG. 5, a primary inductance $L_1$, a secondary inductance $L_2$, a primary and a secondary leakage inductance coefficient $\delta$ (regarding these motor constants, refer to FIG. 8), a desired value $i^*_{1d}$ of exciting current flowing through the motor 5, a speed setting value of the motor 5 (set by the setter 9 in FIG. 5) $\omega^*_m$, and predetermined gain constants $K_1$ and $K_2$ are used to compute output frequency $\omega_1$ of the inverter, and $V_q$ and $V_d$ on the d-q coordinate axis, on the basis of (1), (2) and (3) of the following equation 2 (S63):

[EQUATION 2]

$$\omega_1 = \omega_m^* + \frac{R_2}{L_2 i_{1d}^*} \hat{i}_{1q} \quad (1)$$

$$V_q = R_1 \hat{i}_{1q} + L_1 \omega_1 i_{1d}^* + K_2 \left( i_{1D}^* - i_{1D} + \sigma \frac{\hat{i}_{1Q}^2}{i_{1D}^*} \right) \quad (2)$$

$$V_d = R_2 \hat{i}_{1d} + K_1 \left( i_{1d} - \hat{i}_{1d} + \sigma \frac{\hat{i}_{1q}^2}{i_{1d}^*} \right) \quad (3)$$

Subsequently, the following equation 3 is used to convert $V_q$ and $V_d$ in (2) and (3) of the above-described equation 2 to three-phase output voltages $V_u$, $V_v$ and $V_w$ by C (S64):

[EQUATION 3]

$$\begin{bmatrix} V_u \\ V_v \\ V_w \end{bmatrix} = \sqrt{\frac{2}{3}} \begin{bmatrix} \cos\phi & \sin\phi \\ \cos\left(\phi - \frac{2}{3}\pi\right) & \sin\left(\phi - \frac{2}{3}\pi\right) \\ \cos\left(\phi + \frac{2}{3}\pi\right) & \sin\left(\phi + \frac{2}{3}\pi\right) \end{bmatrix} \begin{bmatrix} V_q \\ V_d \end{bmatrix} = C$$

Furthermore, proportional computation is executed on the basis of the following equation 4 such that $V_u$, $V_v$ and $V_w$ in the above equation 3 computed on the basis of established or fixed voltage of $V_{dc}$ are outputted on the basis of $\hat{V}_{dc}$ detected by the direct-current bus voltage detector 8 illustrated in FIG. 5 (S65).

[EQUATION 4]

$$V_{u,v,w}' = \begin{bmatrix} V_u' \\ V_v' \\ V_w' \end{bmatrix} = \frac{V_{de}}{\hat{V}_{de}} \begin{bmatrix} V_u \\ V_v \\ V_w \end{bmatrix}$$

Switching ON/OFF pulses to the inverter 4 are decided on the basis of the values $V'_u$, $V'_v$ and $V'_w$ computed in the step S65.

Subsequently $\hat{i}_w = -(\hat{i}_u + \hat{i})$ is computed on the basis of $\hat{i}_u$ and $\hat{i}_v$. It is judged whether or not each of $|\hat{i}_u|$, $|\hat{i}_v|$ and $|\hat{i}_w|$ (for example, $|\hat{i}_u|$ indicates an absolute value of $\hat{i}_u$) is brought to a value equal to or more than a predetermined value (judgment is executed regarding overcurrent) (S66). In case where at least one is equal to or above the predetermined value, the output from the inverter apparatus is interrupted or cut off as the overcurrent (S67). Judgment is executed which stops the inverter apparatus if the current value is determined to be abnormal.

In this control system indicated in the flow chart in FIG. 6, control is executed which determines or decides output frequency and output voltage by the above equation 2 according to the characteristic of the motor 5 illustrated in FIG. 5. Particularly, the control system is so characterized as to obtain a large torque, even in a low-speed range of the motor.

② Second Control System (V/F constant control system)

FIG. 7 shows a system which is generally called "V/F constant control" in which portions of the step S62 and the step S63 illustrated in FIG. 6 are changed to a step S72. In the system, $V_d$ is brought to 0 ($V_d=0$) with respect to $V_d$ and $V_q$ which are decided by (2) and (3) in the above equation 2, and $V_q$ is decided on the basis of a voltage-frequency ratio a decided beforehand and a voltage boost b ($V_m = a\omega^*_m$) (where $V_m$ is a maximum value of the output voltage). Output frequency $\omega_1$ uses a value $\omega^*_m$ of the setter 9 illustrated in FIG. 5 as it is (S72). Except for a portion of the step S72, a step S71 and steps S73–S76 are the same as the operation in steps S61 and S64–S67 as illustrated in FIG. 6.

As other reference literatures relating to the present invention, there are Japanese Utility Model Laid-Open No. SHO 62-165799 and Japanese Utility Model Laid-Open No. SHO 63-187591 in addition to "Inverter Apparatus" disclosed in Japanese Patent Laid-Open No. HEI 2-131396.

The conventional inverter apparatus has the following problem. That is, the conventional inverter apparatus used only one of the above-described two control systems. However, the first control system illustrated in FIG. 6 is characterized in that the output torque can be large at a low speed, but, the types of motor are limited because an electric constant of the connected motor is stored beforehand in the inverter apparatus.

Moreover, the V/F constant control system, that is the second control system, has the following problem. Since the motor constant is not used, the apparatus is characterized in that the apparatus can be driven without depending upon the type of the motor. However, the torque at a low speed is limited.

SUMMARY OF THE INVENTION

It is therefore an object of the invention to provide an inverter apparatus and a transport system using the same which can be used stably and economically without practical problem even in the case where a motor is used in switching, with respect to a single converter.

According to the invention, there is provided an inverter apparatus in which the output of a commercial power source is converted to an alternating current of optional frequency and voltage, said inverter apparatus comprising a switch means for switching between a first control mode for deciding output frequency and output voltage and a second control mode for executing V/F constant control in accordance with a characteristic of said motor.

According to the invention, there is provided an inverter apparatus in which the output of a commercial power source is converted to an alternating current of optional frequency and voltage, said inverter apparatus comprising a detecting means for detecting output currents of at least two respective phases out of three output currents of three respective phases, a converting means for converting the currents detected by said detecting means to two axes which are intersected perpendicularly to each other and which are rotated in synchronism with output frequency of said inverter apparatus by an orthogonal projection, a computing means for adding frequency correcting frequency set from the outside, to output voltage and the set frequency, in accordance with current converted to the two axes by said converting means, to compute output frequency, a deciding means for deciding predetermined output voltage and output frequency, by said set frequency, regardless of said currents, and assignment means capable of assigning ON/OFF from the outside, wherein a control mode for deciding output voltage in relation to output current by said computing means and a control mode for deciding output voltage regardless of the output current by said deciding means are switched by said assignment means.

According to the invention, there is also provided a transport system having an inverter apparatus in which the output of a commercial power source is converted to an alternating current of optional frequency and voltage, and a plurality of motors differing in capacity comprising, a switch means for switching between a first control mode for deciding output frequency and output voltage and a second control mode for executing V/F constant control in accordance with a characteristic of said motor.

The control systems are switched on the basis of the signal state of the input terminal, whereby a large torque can be obtained at a low speed, in a case where the motor constant required for control is stored beforehand. When other motors are driven, as indicated by the signal state at the input terminal, the inverter apparatus is controlled without reliance on the motor constant. Accordingly, the inverter apparatus can be run within a range having no practical limit without becoming unsteady or unstable.

As described above, according to the invention, the inverter apparatus for converting the output of a commercial power source to the current of an optional frequency and voltage comprises a plurality of control modes, in which the control modes are switched in accordance with the characteristic of the motor. For this reason, even in case where the motors are switchable with respect to the single inverter without the torque being limited in the low speed, the inverter apparatus can be used stably without practical problem.

Other objects and features of this invention will become understood from the following description with reference to the accompanying drawings.

BRIEF DESCRIPTION OF THE DRAWINGS

FIG. 3 is a timing chart showing a method of selecting a plurality of motors and of selecting input terminals SL;

DESCRIPTION OF THE PREFERRED EMBODIMENTS

EMBODIMENT 1

An embodiment of the invention will hereunder be described with reference to the accompanying drawings.

Figure 1:
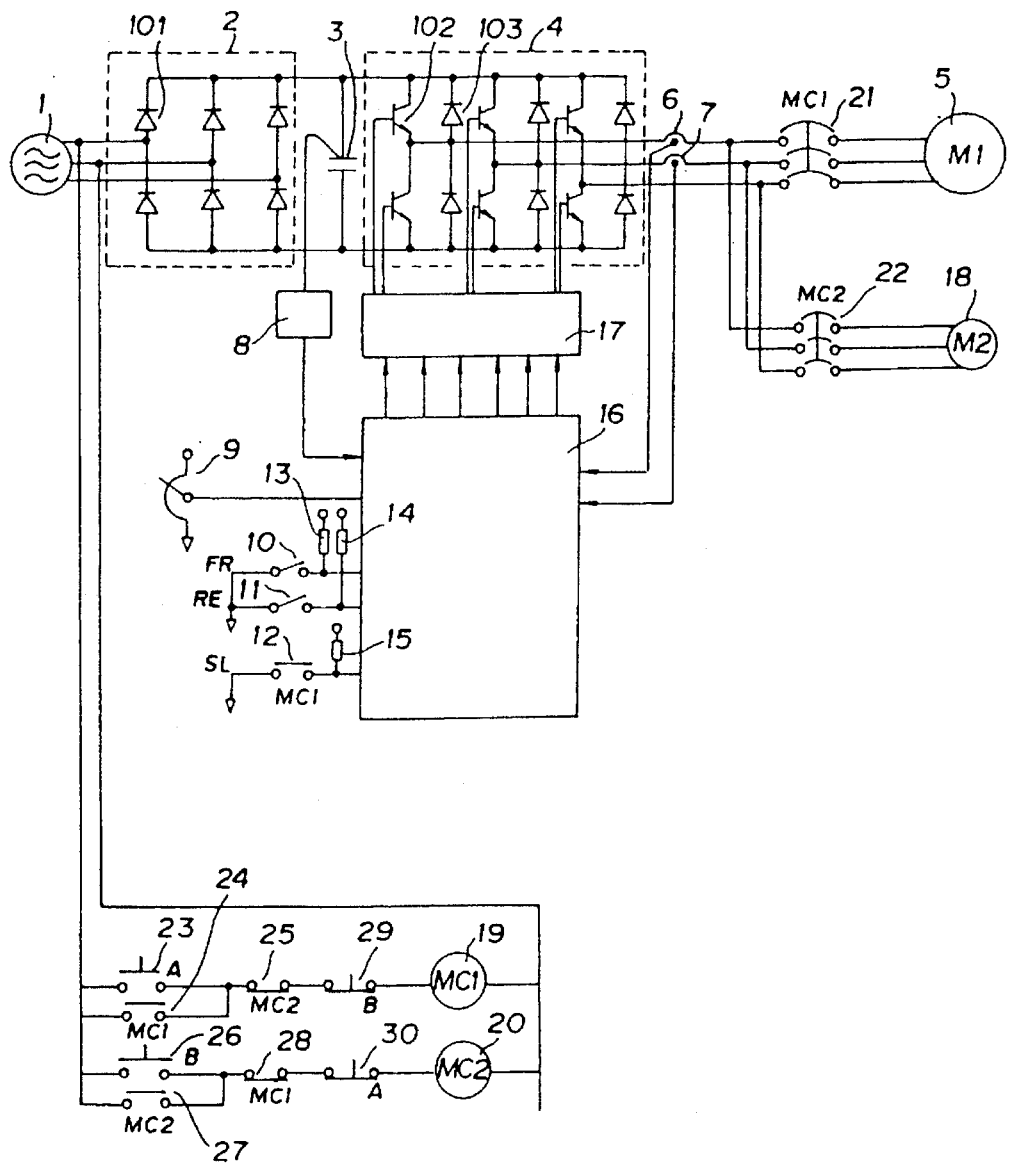
FIG. 1 is a view for showing a circuit arrangement of an inverter apparatus according to the invention.
Figure 5:
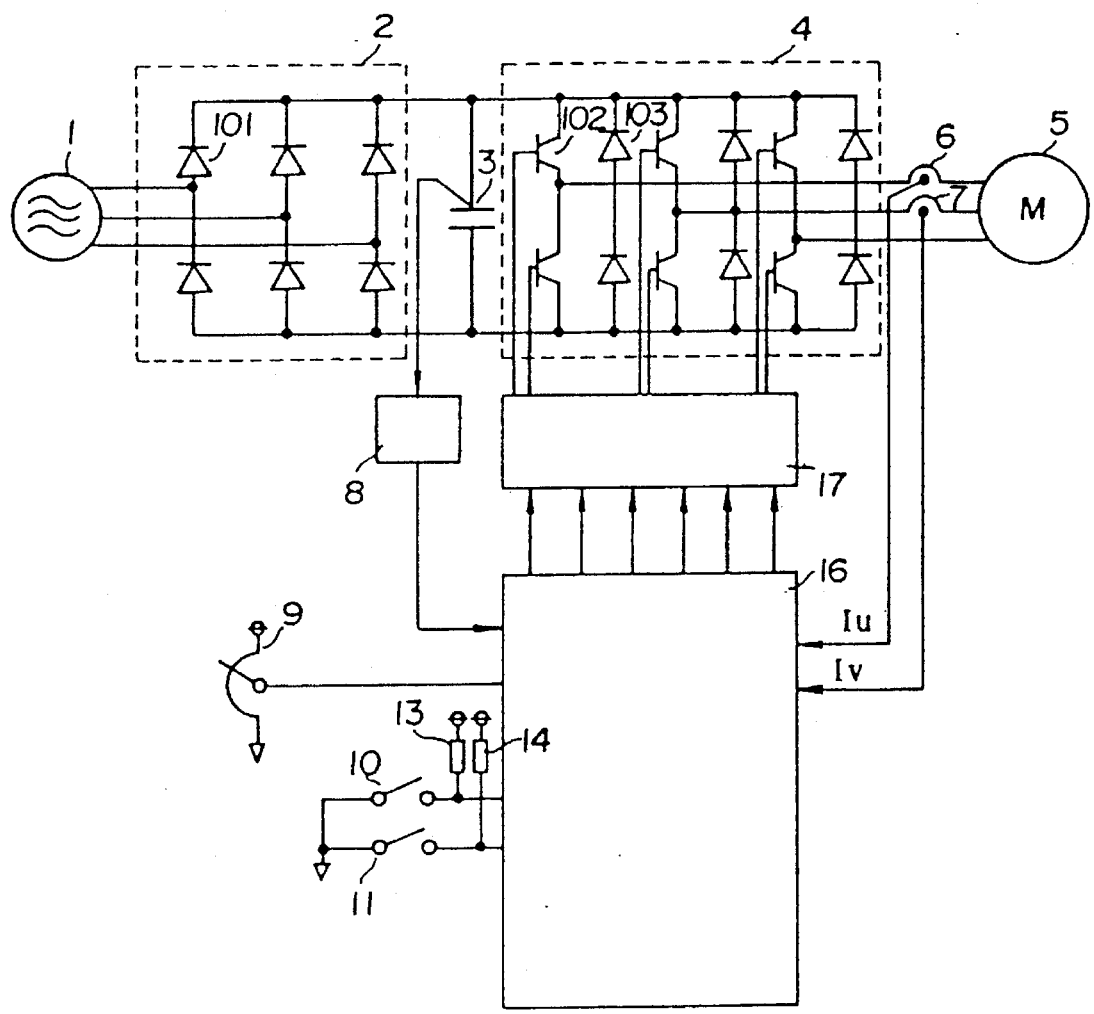
FIG. 5 is a view for explanation of a circuit arrangement of a conventional inverter apparatus.

Referring first to FIG. 1, there is shown a terminal SL for inputting a setting which is added to the conventional system shown in FIG. 5. The reference numeral 1 denotes a commercial power source; 2, a power rectifier for converting the output of the commercial power source 1 to direct current; 3, a capacitor for filtering noisy current to smooth direct current; 4, an inverter for converting the direct current to alternating current of optional frequency and voltage; 5, a motor that is a load; 6 and 7, current detectors by which conversion is made to a voltage signal with or at a predetermined ratio in accordance with the magnitude of the output current (including positive and negative polarities); 8, a direct-current bus voltage detector in which the magnitude of direct-current bus voltage is converted to a voltage signal with a lower predetermined value; 9, a setter for setting a desired speed for the motor 5; and 10 and 11, start switches for setting a rotational direction of the motor 5, respectively.

Further, the reference numerals 13 and 14 denote pull-up resistors in which, even at OFF position of the start switches 10 and 11, a signal to a computer 16 does not become unselective; 16, a computer (for example, a microprocessor) for synthetically discriminating or judging various signals from the setter 9, the start switches 10 and 11, the current detectors 6 and 7 and the direct-current bus voltage detector 8 to send out ON/OFF signals to switching element of the inverter 4; and 17, an amplifier circuit for electrically insulating and amplifying the ON/OFF signals outputted from the computer 16 by light and the like and, subsequently, for sending out signals to various elements of the inverter 4.

In this connection, in FIG. 1, the reference numeral 101 denotes an element which is used in the power rectifier 2, and generally is a diode; 102, an element which is used in the inverter 4, and which may be a transistor, a gate turn-off thyristor (GPO), or an insulating-gate bipolar transistor (IGBT); and 103, a diode connected to the transistor 102 in reversed polarity.

The reference numeral 15 denotes a pull-up resistor similarly to the pull-up resistors 13 and 14; 19 and 20, are electromagnetic switches (MC) for switching between a connection of the inverter to motor 5 and motor 18; 21 and 22 are main contacts for the electromagnetic switch 19 and 20; 23 and 30 are push buttons (A) for connecting the inverter with the motor 5; 26 and 29 are push buttons (B) for connecting the inverter with the motor 18.

Further, in FIG. 1, The reference numeral 24, 25, 27 and 28 denote auxiliary contacts. The electromagnetic switches 19 and 20 cannot be connected at the same time by the auxiliary contact 24, 25, 27 and 28. And the reference numeral 12 denotes a SL terminal for switching the control systems, which is used as an auxiliary contact for the electromagnetic switches 19 and 20. The other circuit arrangements are the same as that illustrated in FIG. 5. The reference numerals which are the same as those illustrated in FIG. 5 denote the same functions.

Figure 2:
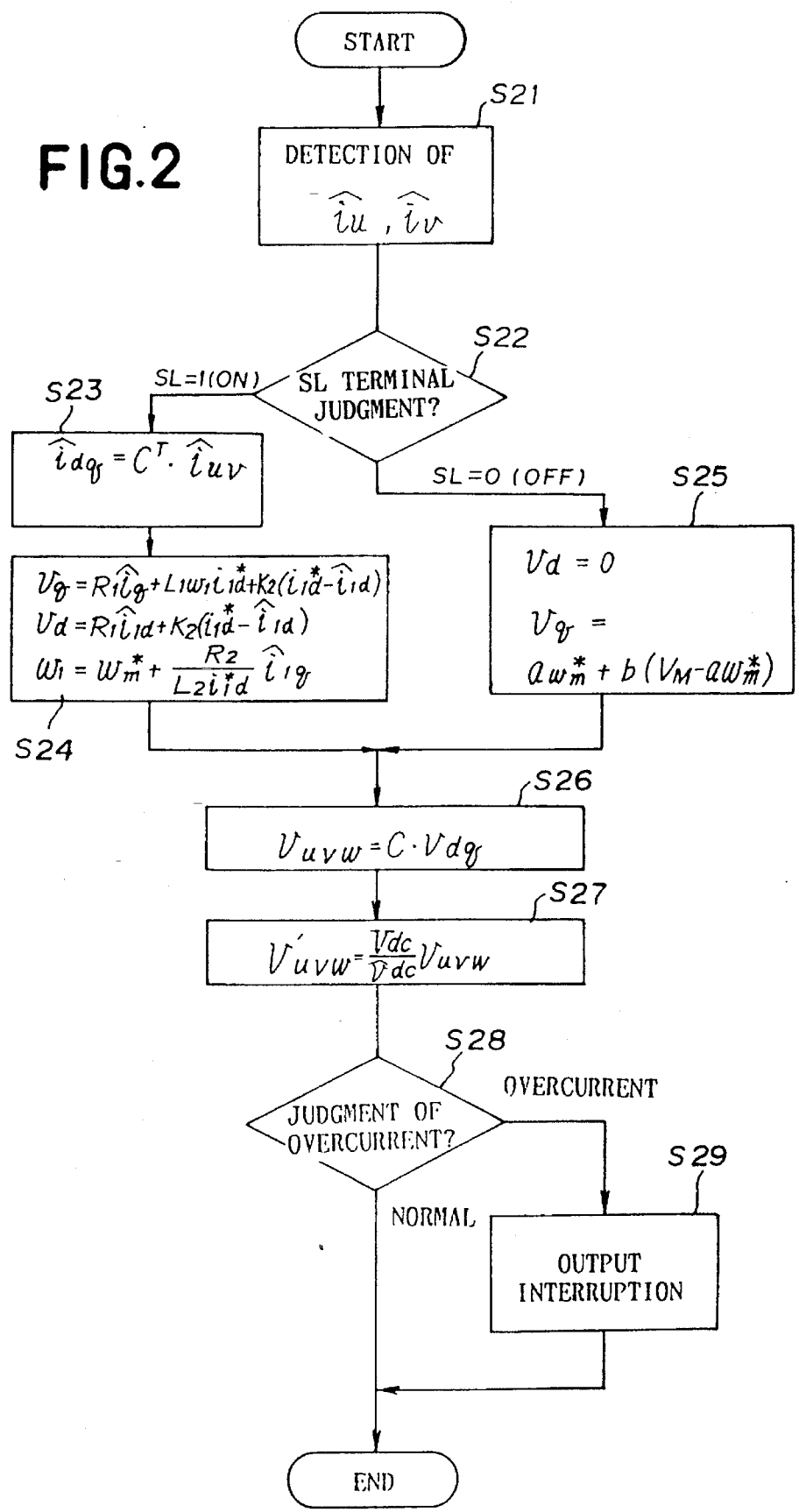
FIG. 2 is a flow chart showing operation of the inverter apparatus according to the invention.
Figure 6:
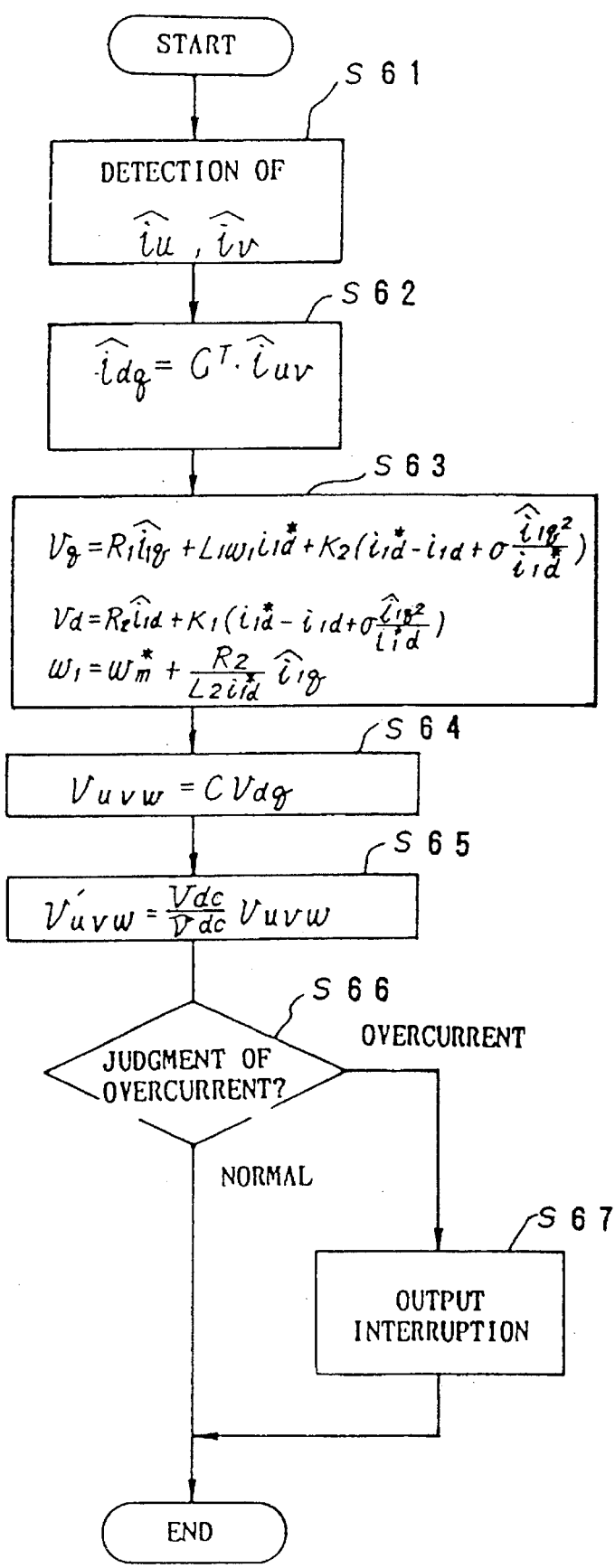
FIG. 6 is a flow chart showing an operation of a conventional inverter apparatus.
Figure 7:
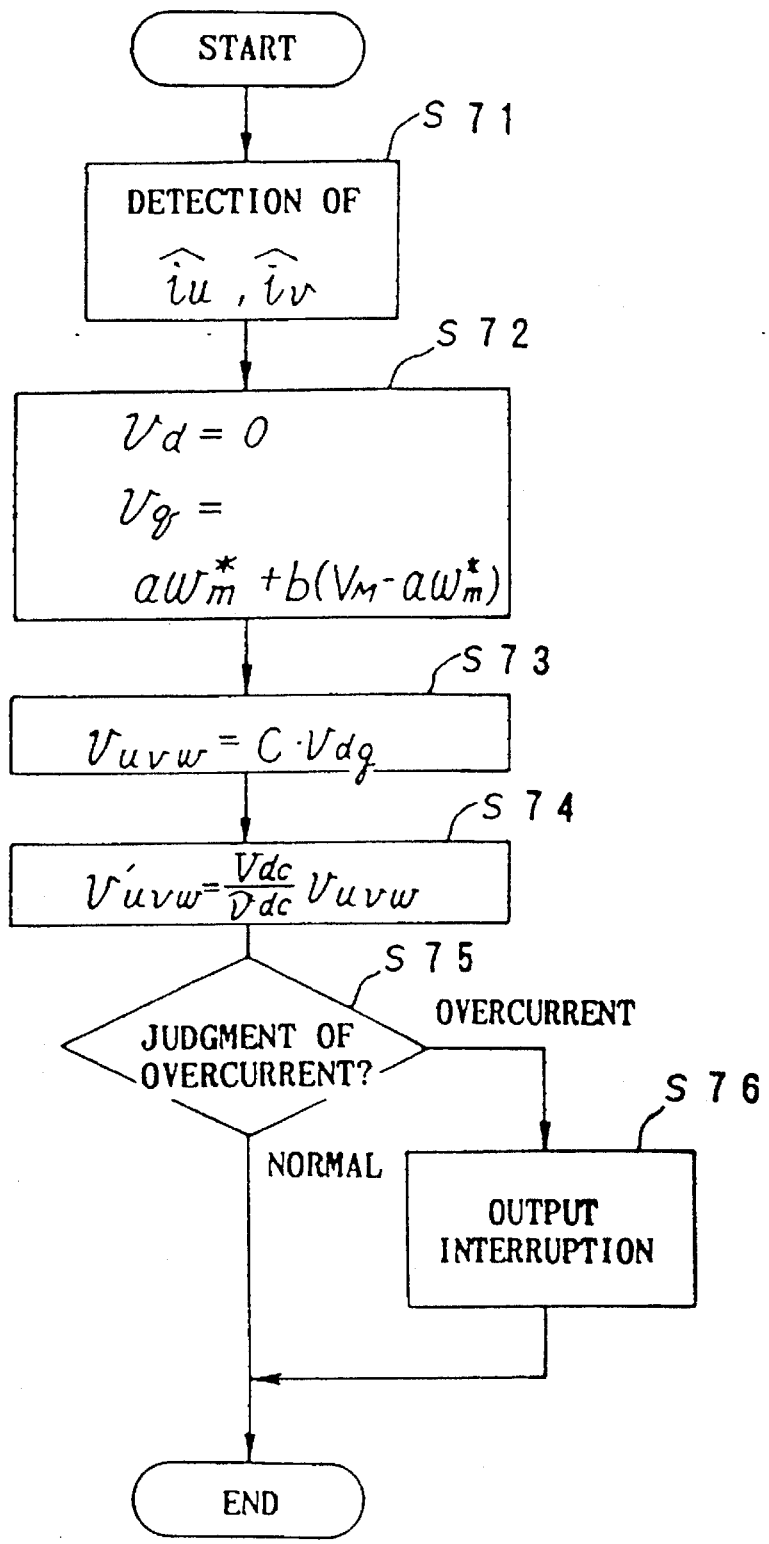
FIG. 7 is a flow chart showing another operation of a conventional inverter apparatus.
Figure 8:
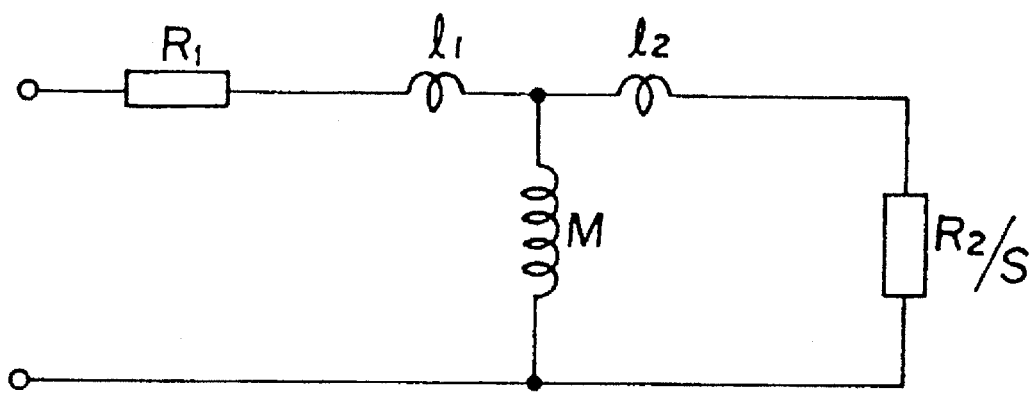
FIG. 8 is a view for showing an equivalent circuit of the invention corresponding to a single phase of a motor.

Operation will next be described. FIG. 2 is a flow chart showing operation of an inverter apparatus according to the invention. First, a voltage value converted by a pair of current detectors 6 and 7 is converted by an A/D converter arranged within a computer 16, and is stored in a memory element within the computer 16 as $\hat{i}_u$ and $\hat{i}_v$ (S21). Subsequently, a signal status or condition of the SL terminal 12 illustrated in FIG. 1 is judged (S22). When the SL terminal 12 is turned ON (closed) by setting the push button (A) 23 to ON, control of a step S23 and step S24 (first control system) is executed with SL being 1 (SL= 1). Conversely, when the SL terminal 12 is turned OFF (open) by setting the push button (B) 26 to ON, control is executed to a step S25 (second control system) with SL being 0 (SL=0). Subsequent operations in step S26 to step S29 are the same as steps S64 to S67 described with reference to the flow chart illustrated in FIG. 6.

Namely, in case where the push button (A) 23 is set to ON, the electromagnetic switch (MC1) 19 is closed, the motor (M1) 5 is driven and the SL terminal 12 is closed; as a result, the first control system is executed. Conversely, in case where the push button (B) 26 is set to ON, the electromagnetic switch (MC2) 20 is closed, the motor (M2) 18 is connected to the inverter and the SL terminal 12 is opened; as a result, the second control system is executed.

Accordingly, as shown in FIG. 3, the SL terminal 12 is used so as to be operated ON/OFF (SL terminal is turned ON at an area where MC1 is turned ON, while SL terminal is turned OFF at an area where MC2 is turned ON) in synchronism with movement of the electromagnetic switch (MC) 19, 20 as a switch. In this way, in case where a motor whose control constant is stored in the inverter apparatus is driven, there can be produced a large torque at a low speed. By operation or running of a motor where control constant is not stored, and a plurality of motors including the aforesaid motor when the constant is stored, there may be motor control in which the V/F is constant is executed other than the constant stored in the inverter apparatus in view of control performance. Thus, where there is concern that a motor torque may be insufficient at a low speed, thereby raising problems with motor instability, proper operation is made possible. That is, input switching of the SL terminal 12 makes it possible to select running in which a predetermined V/F is constant without relying on the motor constant, thereby making it possible to drive the motor in stable state.

EMBODIMENT 2

Figure 4:
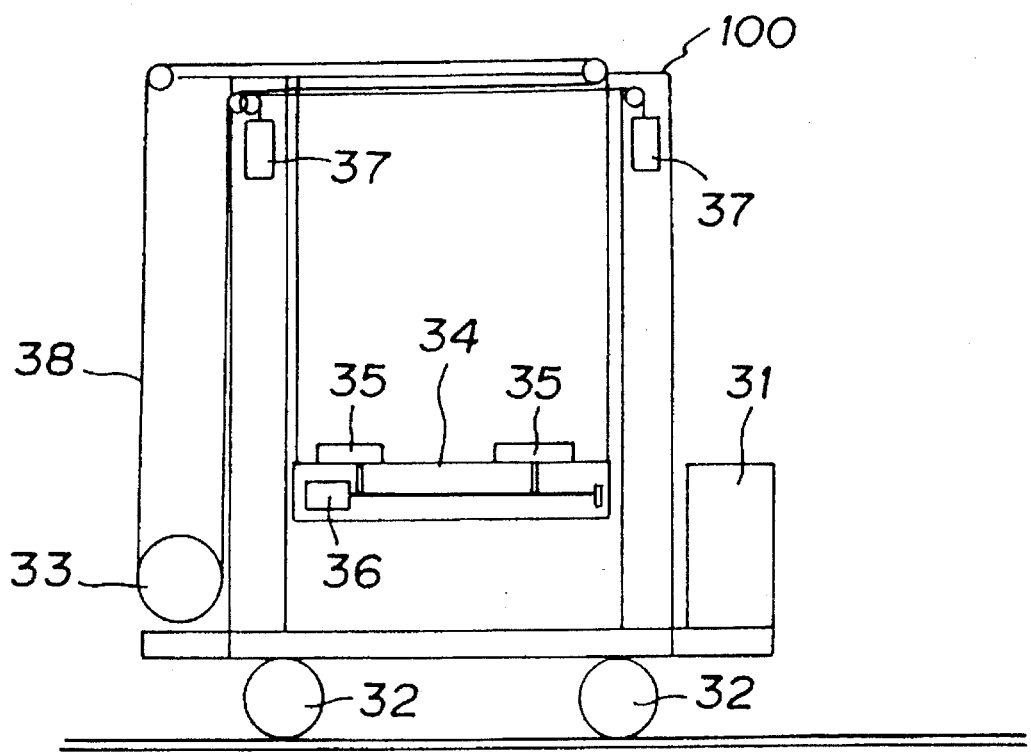
FIG. 4 is a view for explanation of a transport system according to the invention.

FIG. 4 shows a structure of an automatic transport system 100 using the inverter apparatus according to the invention. In FIG. 4, the reference numeral 31 denotes a motor for driving the transport system 100; 32, a wheel which is driven by the motor 31; 33, a motor for moving a carriage up-and-down; 34, a carriage; 35, a fork for holding baggage and moving it back and forth; 36, a motor for driving the fork 35; 37, balance weight for the carriage 34; 38, chain.

Operation will next be described. The transport system 100, illustrated in FIG. 4, is for transporting baggage from one place to another place. Accordingly, the motor 31 and the motor 33 may be driven at the same time. The motor 36, however, may not be driven with the motor 31 at the same time because the motor 36 is driven only after the transport system 100 arrives at a certain place.

Using the present invention, all three motors may be driven by a single inverter. The inverter is generally controlled by a switching operation, and the inverter is selected in accordance with the capacity of the motor 31. Generally, the capacity of the motor 36 is extremely small in comparison with capacity of the motor 31. In case where the motor is driven, a first control system which can output a sufficient torque is used. This control system, however can not be used to control a motor where a motor constant is necessary. Accordingly, in case where the motor 36 is driven, the first control system is switched to a second control system. As a result, there is provided an economical transport system.

In portions of the step S23 and the step S24 illustrated in FIG. 2, other control systems may be used. For example, the control system may be a vector control system of generally well known type in which the speed of the motor is detected, and is fed back.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus in which an output of a commercial power source is converted to a multi-phase alternating current output of selectable output frequency and selectable voltage for driving a first motor and a second motor, comprising:

power rectifying means for rectifying the output of the commercial power source into direct current;

inverting means for converting the direct current from the power rectifying means into alternating current having a selectable frequency, a selectable voltage and at least two different phases and outputting the alternating current;

said selectable frequency and selectable voltage determined by control signals received by the inverting means;

detecting means for detecting the at least two different phases of alternating current from said inverting means and outputting first and second analog values representing current magnitudes of the at least two different phases, respectively;

speed setting means for providing a speed setting value for setting a desired speed of said first or second motor;

assignment means assigning an ON/OFF signal;

converting means for converting the first and second analog values output by said detecting means to first and second digital values, $\hat{i}_u$ and $\hat{i}_v$, respectively;

computing means for outputting a first set of control signals to the inverting means for driving the first motor according to a first control mode and a second set of control signals for driving the second motor according to a second control mode in response to a first state and a second state of the ON/OFF signal received from said assignment means, respectively;

said computing means determining said first control mode for said first set of control signals according to the first and second digital values, $\hat{i}_u$ and $\hat{i}_v$ and characteristics of the first motor and the speed setting value and where $\hat{i}_u$ and $\hat{i}_v$ are converted to currents $\hat{i}_d$ and $\hat{i}_q$, respectively, according to the equation:

$$\left| \begin{array}{c} i_q \\ i_d \end{array} \right| = \sqrt{2} \left| \begin{array}{cc} \sin\left(\phi + \frac{\pi}{3}\right) & \sin(\phi) \\ -\cos\left(\phi + \frac{\pi}{3}\right) & -\cos(\phi) \end{array} \right| \left| \begin{array}{c} i_u \\ i_v \end{array} \right|$$

where ø is a function of the speed setting value; and said computing means determining said second control mode for said second set of control signals according to a predetermined voltage-frequency ratio and the speed setting value from the speed setting means.

2. An inverter apparatus according to claim 1, wherein said first control mode and said second control mode can be switched only while said inverter apparatus is not being operated.

3. A transport system comprising an inverter apparatus in which an output of a commercial power source is converted to an alternating current at a selectable frequency and selectable voltage for driving a motor, and a plurality of motors, at least two of said plurality of motors having different capacities, comprising;

switch means connected to said inverter apparatus for switching in accordance with a characteristic of at least one of said plurality of motors between a first control mode for selectively controlling output frequency and output voltage and a second control mode for executing voltage/frequency constant control.

* * * * *